United States Patent
Kiyoshita et al.

(10) Patent No.: US 9,623,910 B2
(45) Date of Patent: Apr. 18, 2017

(54) SIDE VEHICLE-BODY STRUCTURE OF VEHICLE

(71) Applicant: MAZDA MOTOR CORPORATION, Hiroshima (JP)

(72) Inventors: Daisuke Kiyoshita, Hiroshima (JP); Masanori Fukuda, Hiroshima (JP); Toshiharu Ikeda, Hiroshima (JP); Soukichi Kikuchi, Higashihiroshima (JP); Takashi Hamada, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 0 days.

(21) Appl. No.: 14/826,808

(22) Filed: Aug. 14, 2015

(65) Prior Publication Data

US 2016/0083015 A1 Mar. 24, 2016

(30) Foreign Application Priority Data

Sep. 19, 2014 (JP) ................................ 2014-190787

(51) Int. Cl.
- *B62D 21/15* (2006.01)
- *B62D 25/04* (2006.01)
- *B62D 25/02* (2006.01)

(52) U.S. Cl.
CPC ......... *B62D 21/152* (2013.01); *B62D 25/025* (2013.01); *B62D 25/04* (2013.01)

(58) Field of Classification Search
CPC ...... B62D 21/15; B62D 21/152; B62D 25/02; B62D 25/04
USPC .............. 296/30, 187.09, 187.1, 193.06, 202
See application file for complete search history.

(56) References Cited

U.S. PATENT DOCUMENTS

| 4,550,948 | A * | 11/1985 | Hamada | B62D 27/02 296/202 |
|---|---|---|---|---|
| 2015/0344071 | A1* | 12/2015 | Nakano | B62D 25/04 296/187.09 |
| 2016/0001727 | A1* | 1/2016 | Watterworth | B62D 21/15 280/784 |

(Continued)

FOREIGN PATENT DOCUMENTS

| DE | 102007011719 A1 * | 9/2008 | ............. B62D 21/15 |
|---|---|---|---|
| JP | 2013-141928 A | 7/2013 | |

OTHER PUBLICATIONS

English Translation of DE 10 2007 011 719; retreived Aug. 29, 2016 via PatentTranslate located at www.epo.org.*

*Primary Examiner* — Jason S Daniels
(74) *Attorney, Agent, or Firm* — Studebaker & Brackett PC

(57) ABSTRACT

There are provided a hinge pillar comprising an outer panel and an inner panel which form a closed cross section extending vertically, a hinge pillar reinforcement provided in the closed cross section, a front door attached to the hinge pillar via a pair of upper-and-lower door hinges, and a hinge bracket attaching the lower door hinge to the hinge pillar reinforcement, the hinge bracket being provided to face a front wheel in a longitudinal direction. Herein, the hinge bracket has a lower strength than a portion of the hinge pillar reinforcement where the hinge bracket is provided. Accordingly, when receiving a collision load from the front wheel, the hinge bracket changes a contact portion of the front wheel to the hinge pillar so as to guide the retreating front wheel outward in a vehicle width direction.

7 Claims, 6 Drawing Sheets

(56) References Cited

U.S. PATENT DOCUMENTS

2016/0039466 A1* 2/2016 Yamamoto ............. B62D 25/04
                                                        296/193.06
2016/0194031 A1* 7/2016 Yamamoto ........... B62D 25/025
                                                        296/187.1
2016/0194032 A1* 7/2016 Yamamoto ............. B62D 21/15
                                                        296/193.05

* cited by examiner

SIDE VEHICLE-BODY STRUCTURE OF VEHICLE

BACKGROUND OF THE INVENTION

The present invention relates to a side vehicle-body structure of a vehicle, and in particular, relates to the side vehicle-body structure of the vehicle which comprises a hinge bracket to attach a door hinge to a hinge pillar reinforcement.

Conventionally, a hinge pillar and a front pillar which interconnect, in a vertical direction, a front end portion of a roof side rail extending in a longitudinal direction (a side end portion of a front header) and a front end portion of a side sill extending in the longitudinal direction are provided at a side portion of a vehicle body. The front pillar is provided to be continuous to an upper end of the hinge pillar. Since the hinge pillar forms a front-side portion of a periphery of an ingress/egress opening for passengers, a pair of upper-and-lower door hinges which support a front door so that the front door can open or close the ingress/egress opening for passengers are attached to a hinge pillar reinforcement.

The hinge pillar is provided to face a front wheel in the longitudinal direction. Therefore, since the front wheel retreats (moves rearward) when receiving a collision load in a vehicle frontal collision, there is a situation where the collision load is directly transmitted to the vehicle body via the front wheel with no impact reduction. In a small overlap collision (hereafter, referred to as a "SOL collision"), since a collision object and a front side frame do not overlap each other, there is a concern that when the retreating front wheel interferes with the hinge pillar, the collision load inputted from the front wheel may cause deformation of a vehicle compartment's space around passengers, such as the hinge pillar. In particular, in a case in which a sufficient vehicle-width is required from vehicle designing, the hinge pillar is located at a more outward position of the vehicle than usual, so that the front wheel tends to interfere with the hinge pillar highly possibly. Accordingly, some technologies of preventing such deformation of the vehicle compartment's space caused by the collision load inputted from the front wheel have been proposed.

A side vehicle-body structure of a vehicle disclosed in Japanese Patent Laid-Open Publication No. 2013-141928 comprises a hinge pillar including a pillar outer panel having a front wall face and a pillar inner panel which form a closed cross section extending vertically, a hinge pillar reinforcement provided in the above-described closed cross section and including a slant face, and a guide means for guiding the front wheel rearward and outward in a vehicle collision. Herein, the guide means is configured such that a cross angle between the slant face and its side wall face is set to be smaller than a cross angle between the front wall face and the side wall face. Thereby, the front wheel can be guided from an inward side to an outward side in the vehicle width direction in the SOL collision, so that the collision load can be directed (i.e., released) outward in the vehicle width direction.

The above-described side vehicle-body structure of the vehicle of the patent document is configured to make the front wheel slide outward in the vehicle width direction along the guide means, so that the amount (degree) of deformation of the hinge pillar caused by the interference with the front wheel can be properly reduced. However, according to this side vehicle-body structure of the vehicle, since the slant face of the guide means integrally formed at the hinge pillar reinforcement is provided with a guide function of the retreating front wheel, the hinge pillar reinforcement itself including the slant face is required to have a strength that is high enough to bear the collision load, so that there is a concern that the gross weight of the hinge pillar reinforcement may increase improperly.

SUMMARY OF THE INVENTION

Accordingly, an object of the present invention is to provide a side vehicle-body structure of a vehicle which can properly reduce the amount (degree) of deformation caused by the interference of the front wheel, attaining light weight of the vehicle.

The present invention is a side vehicle-body structure of a vehicle, comprising a hinge pillar comprising an outer panel and an inner panel which form a closed cross section extending vertically, a hinge pillar reinforcement provided in the closed cross section of the hinge pillar, a front door attached to the hinge pillar via a pair of upper-and-lower door hinges, and a hinge bracket attaching the lower door hinge to the hinge pillar reinforcement, the hinge bracket being provided to face a front wheel in a longitudinal direction, wherein the hinge bracket has a lower strength than a portion of the hinge pillar reinforcement where the hinge bracket is provided (i.e., in the vicinity of the hinge bracket).

According to the present side vehicle-body structure, since the hinge bracket has the lower strength than the portion of the hinge pillar reinforcement where the hinge bracket is provided, it is not necessary that the hinge pillar reinforcement including the portion where the hinge bracket is provided is configured to have a strength that is high enough to bear the collision load. Therefore, light weight of the hinge pillar reinforcement can be attained. Further, since the hinge bracket is deformable or detachable from the hinge pillar reinforcement when receiving the collision load from the front wheel, the front wheel retreating because of the deformation of the hinge bracket can be guided outward in the vehicle width direction properly when the collision load is inputted from the front wheel.

In an embodiment of the present invention, the hinge bracket is integrally formed at the hinge pillar reinforcement, and configured to deform when receiving a collision load from the front wheel. Thereby, in the vehicle in which the hinge bracket and the hinge pillar reinforcement are formed as a single piece member, the retreating front wheel can be guided outward in the vehicle width direction properly when the collision load is inputted from the front wheel.

In another embodiment of the present invention, the hinge bracket is formed as a separate member from the hinge pillar reinforcement and attached to the hinge pillar reinforcement, and the hinge bracket is configured to deform or be detached from the hinge pillar reinforcement when receiving the collision load from the front wheel. Thereby, in the vehicle in which the hinge bracket is formed as the separate member from the hinge pillar reinforcement and attached to the hinge pillar reinforcement, the retreating front wheel can be guided outward in the vehicle width direction properly when the collision load is inputted from the front wheel.

In another embodiment of the present invention, the hinge bracket includes a front wall portion which is provided to face an upper-half portion of the front wheel in the longitudinal direction, the front wall portion being configured to slant downward and rearward in a side view (i.e., when viewed from the side). Thereby, the front wall portion forms a large-area load reception portion with a slant portion of the front wheel, so that the efficiency of load transmission can be increased. Therefore, the outward guidance of the retreating front wheel can be promoted with a simple structure.

In another embodiment of the present invention, the hinge bracket includes a pair of upper-and-lower lateral wall portions, which are configured to slant rearward and downward in the side view. Thereby, deformation of the hinge bracket can be promoted so as to improve the impact-absorption effect.

Other features, aspects, and advantages of the present invention will become apparent from the following description which refers to the accompanying drawings.

BRIEF DESCRIPTION OF THE DRAWINGS

FIG. 7A being a perspective view; FIG. 7B being a side view; FIG. 7C being a front view; and FIG. 7D being a plan view.

FIG. 8A showing an initial collision stage; FIG. 8B showing a middle collision stage; and FIG. 8C showing a late collision stage.

DETAILED DESCRIPTION OF THE INVENTION

Figure 1:
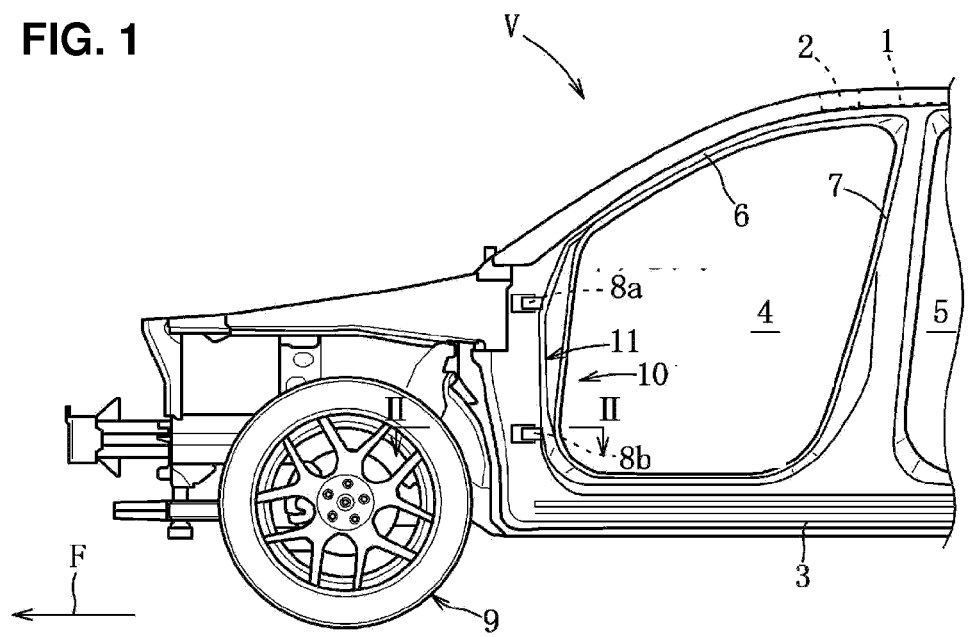
FIG. 1 is a side view of a vehicle-body front portion according to an embodiment of the present invention, when viewed from a left side of a vehicle.

Hereafter, an embodiment of the present invention will be described specifically referring to the drawings. The following description exemplifies an example in which the present invention is applied to a vehicle, and does not limit the present invention and applications or uses of the present invention. In the figures, an arrow F shows a forward direction and an arrow L shows a leftward direction.

The embodiment of the present invention will be described referring to FIGS. 1-9. As shown in FIG. 1, a vehicle V comprises a pair of right-and-left roof side rails 1 which respectively have a closed cross section and extend in a longitudinal direction at right-and-left both end positions of a vehicle-body upper end portion, a front header 2 which has a closed cross section and connects respective front end portions of the pair of roof side rails 1, a pair of right-and-left side sills 3 which respectively have a closed cross section and extend in the longitudinal direction at right-and-left both end positions of a vehicle-body lower end portion, a pair of right-and-left opening portions for front doors 4 which are closable with a pair of right-and-left front doors (not illustrated), and a pair of right-and-left opening portions for rear doors 5 which are closable with a pair of right-and-left rear doors (not illustrated). Herein, since the above-described pairs of right-and-left members are symmetrical, each left-side member will be described mainly.

The opening portion for the front door 4 is formed by a front pillar 6 and a hinge pillar 10 which form a front edge together, a center pillar 7 which forms a rear edge, a front-end side portion of a roof side rail 1 which connects an upper end portion of the front pillar 6 and an upper end portion of the center pillar 7, and a front-end side portion of the side sill 3 which connects a lower end portion of the hinge pillar 10 and a lower end portion of the enter pillar 7. The front pillar 6 has a closed cross section which is formed by a front pillar outer and a front pillar inner and slants downward and forward.

Next, the hinge pillar 10 will be described. The hinge pillar 10 is configured such that its lower-end side portion faces a front wheel 9, and pivotally supports the front door via a pair of upper-and-lower door hinges 8a, 8b. An upper end portion of the hinge pillar 10 is joined to a lower end portion of the front pillar 6 so that the respective closed cross sections of the both pillars 6, 10 are continuous to each other in a vertical direction. Thus, the closed cross section of the front pillar 6 is continuous to the closed cross sections of the roof side rail 1 and the front header 2 and the closed cross section C of the hinge pillar 10 is continuous to the closed cross section of the side sill 3, so that there is provided a ring-shaped closed cross section around the opening portion for the front door 4.

As shown in FIGS. 1-5, the hinge pillar 10 which extends roughly vertically downward from a lower end portion of the front pillar 6 comprises an outer panel 11, an inner panel 12 which forms the vertically-extending closed cross section C together with the outer panel 11, a hinge pillar reinforcement 13 which reinforces the rigidity of the hinge pillar 10, an upper-side hinge gusset 14a which reinforces the support rigidity of the upper-side door hinge 8a, a lower-side hinge gusset 14b which reinforces the support rigidity of the lower-side door hinge 8b, a hinge bracket 15 which attaches the lower-side door hinge 8b to the hinge pillar reinforcement 13, and others.

Figure 2:
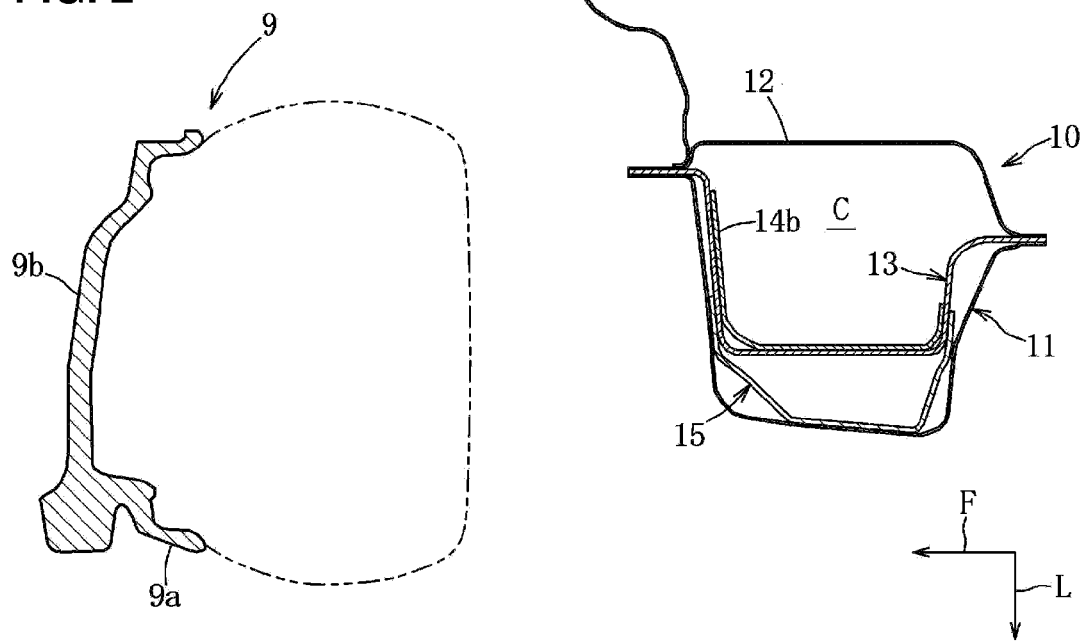
FIG. 2 is a side view taken along line II-II of FIG. 1.

As shown in FIG. 2, the outer panel 11 is formed by a portion of a front-end side portion of a side panel outer which forms a vehicle-body outer wall. This outer panel 11 has a roughly hat-shaped cross section which is configured to protrude leftward such that a side wall portion formed at a left end thereof is positioned on a left side of the center, in the vehicle width direction, of the front wheel 9 directed in a straight-forward direction and on a right side of a left end portion of the front wheel 9 directed in the straight-forward direction.

Figure 3:
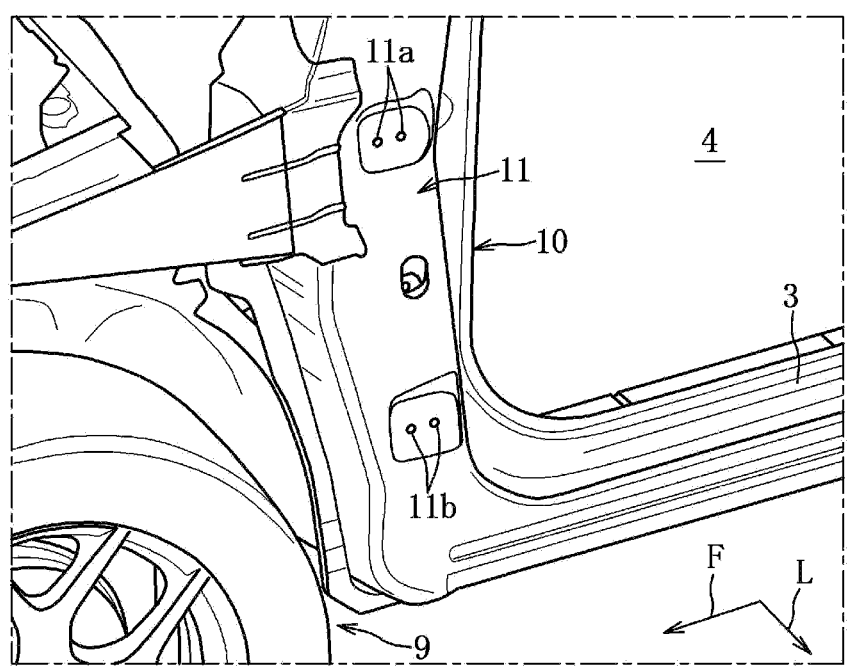
FIG. 3 is a major-part perspective view of FIG. 1.
Figure 4:
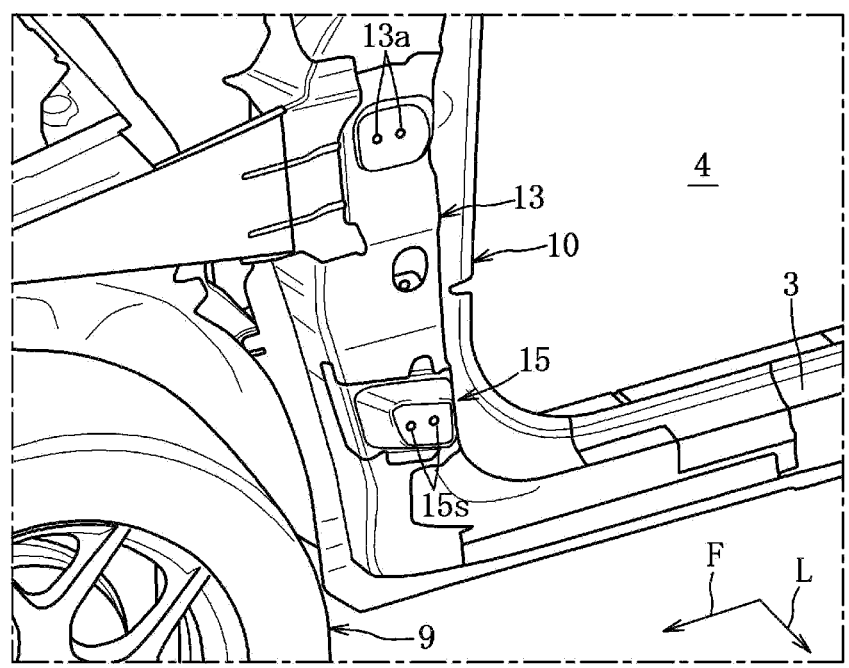
FIG. 4 is a major-part perspective view of FIG. 3, omitting illustration of an outer panel.

As shown in FIG. 3, at the outer panel 11 are formed a pair of front-and-rear upper-side bolt holes 11a and a pair of front-and-rear lower-side bolt holes 11b at an upper-end side portion and a lower-end side portion of its side wall portion which respectively correspond to the both door hinges 8a, 8b. The upper-side bolt holes 11a and the lower-side bolt holes 11b are located at the same position (on the same vertical face) in the vehicle width direction in a front view (i.e., when viewed from the front).

As shown in FIG. 2, the inner panel 12 has a roughly hat-shaped cross section which is configured to slightly protrude rightward such that a side wall portion formed at a right end thereof is positioned on a left side of a right end portion of the front wheel 9 directed in the straight-forward direction. Both flange portions formed at a front end portion and a rear end portion of the inner panel 12 are respectively joined to both flange portions formed at a front end portion and a rear end portion of the outer panel 11, so that the closed cross section C extending vertically is formed.

The hinge pillar reinforcement which vertically extends and has the roughly hat-shaped cross section protruding leftward is arranged in the closed cross section C. This hinge pillar reinforcement 13 is made from high tension steel which has a specified tensile strength or greater through pressing. Front and rear flange portions of the hinge pillar reinforcement 13 which are respectively formed at its front and rear end portions are interposed between and welded to the respective front and rear flange portions of the outer panel 11 and the inner panel 12.

Figure 6:
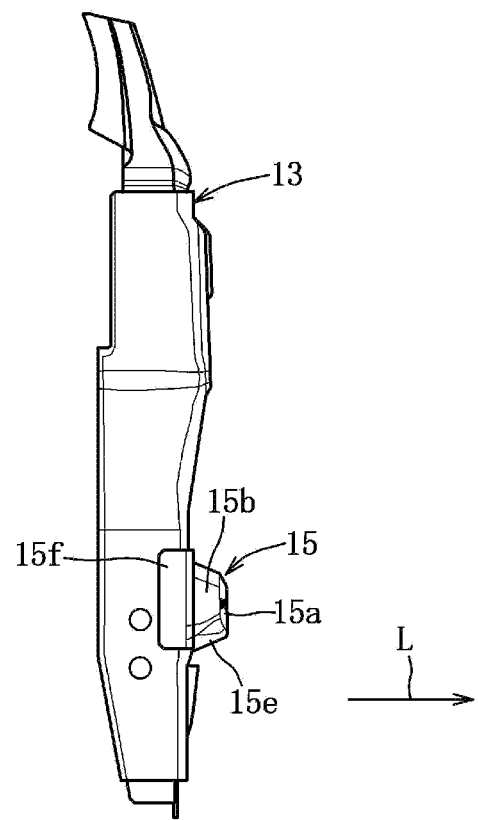
FIG. 6 is a front view of the hinge pillar reinforcement and a hinge bracket.
Figure 7A:
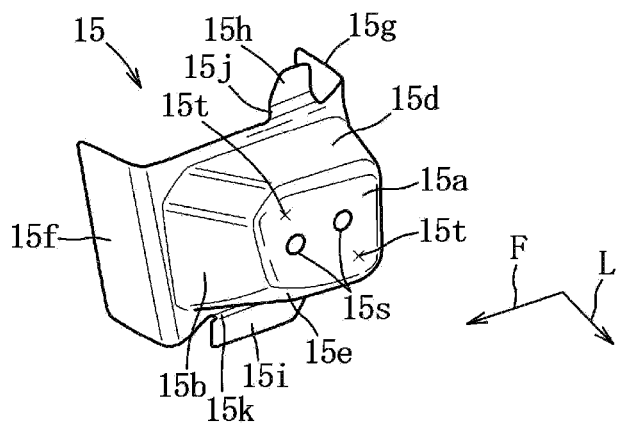
FIGS. 7A-7D are views of the hinge bracket for explanation.
Figure 7B:
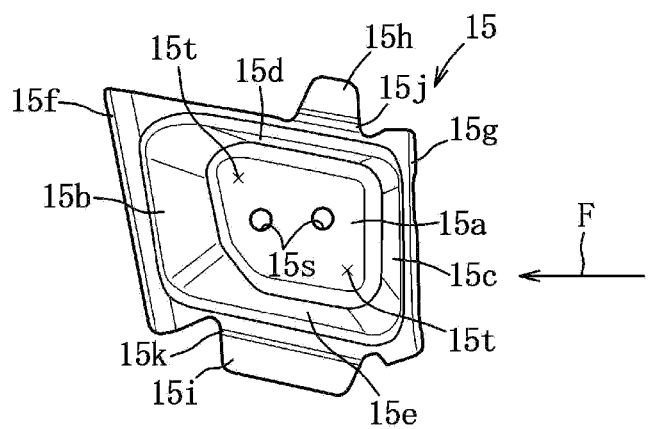
Figure 7C:
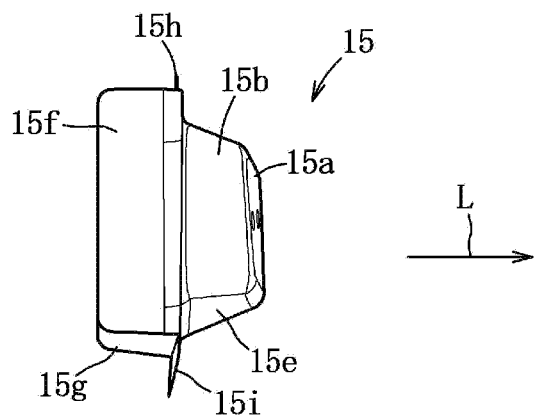
Figure 7D:
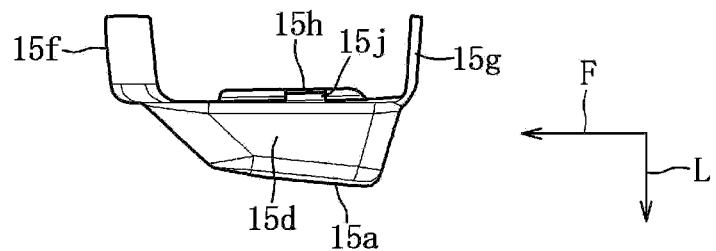

As shown in FIG. 6, the hinge pillar reinforcement 13 is configured such that a lateral length of its lower-half portion is shorter than that of its upper-half portion by a specified length in the front view (when viewed from the front). A side wall portion of the upper-half portion has a pair of bolt holes 13a which are formed at front and rear positions which correspond to the above-described pair of upper-side bolt holes 11a, and is joined to the side wall portion of the outer panel 11. A side wall portion of the lower-half portion is configured to partition the closed cross section C into an outward part and an inward part, and has a pair of front-and-rear welding holes (not illustrated) for welding the hinge bracket 15 to a back face of the side wall portion of the outer panel 11.

Figure 5:
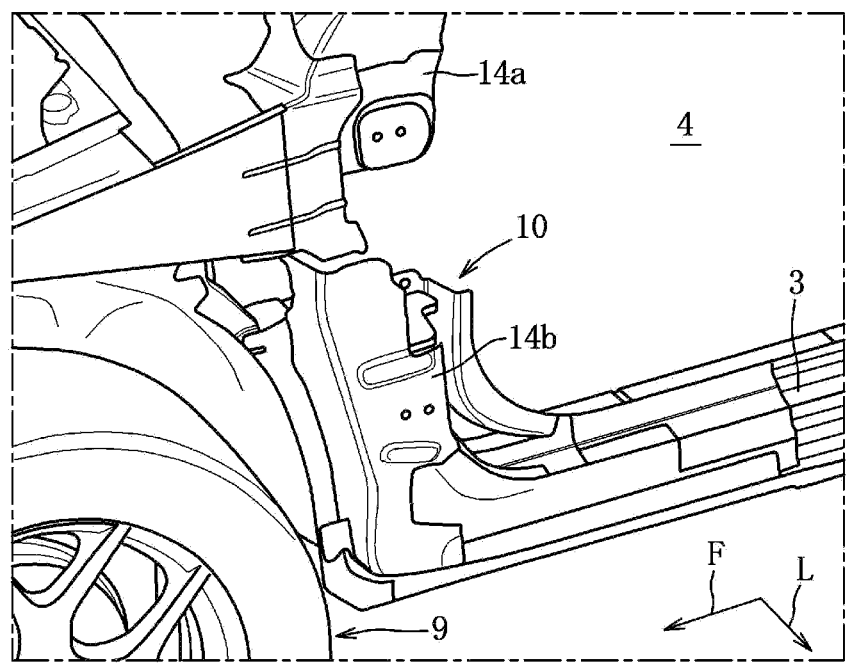
FIG. 5 is a major-part perspective view of FIG. 4 in a state in which illustration of a hinge pillar reinforcement is omitted.

As shown in FIG. 5, an upper-side hinge gusset 14a and a lower-side hinge gusset 14b which have a roughly U-shaped cross section are arranged between the hinge pillar reinforcement 13 and the inner panel 12. The hinge gussets 14a, 14b are made from high tension steel through pressing, and joined to the hinge pillar reinforcement 13, corresponding to the door hinges 8a, 8b. Herein, the hinge gussets 14a, 14c may be made as a single piece.

Next, the hinge bracket 15 will be described. Between the lower-half portion of the hinge pillar reinforcement 13 and the outer panel 11 is arranged the hinge bracket 15. This hinge bracket 15 is made of a steel plate which has a relatively low strength, compared to the hinge pillar reinforcement 13, such as a soft steel plate, and formed in a partially quadrangular-pyramid shape through pressing. As shown in FIGS. 7A-7D, the hinge bracket 15 comprises a hinge-attachment wall portion 15a, a pair of front-and-rear vertical wall portions 15b, 15c, a pair of upper-and-lower lateral wall portions 15d, 15e, a pair of front-and-rear vertical flange portions 15f, 15g, an upper lateral flange portion 15h, a lower lateral flange portion 15i, and others.

The hinge attachment wall portion 15a is configured to have a face contact with the outer panel 11, and a pair of bolt holes 15s which are located longitudinally side by side are formed at this hinge-attachment wall portion 15a at positions which correspond to the lower-side bolt holes 11b of the outer panel 11. Further, a pair of joint portions 15t are formed on the hinge-attachment wall portion 15a at positions which correspond to the pair of welding holes of the hinge pillar reinforcement 13, and these joint portions 15t are joined to a back face of the side wall portion of the outer panel 11 by welding. The front-side joint portion 15t is arranged above the front-side bolt hole 15s and the rear-side joint portion 15t is arranged below the rear-side bolt hole 15s, so that the hinge-attachment wall portion 15a is formed in a roughly parallelogram shape in the side view, thereby improving the area minimization and the pressing workability.

The front vertical wall portion 15b is provided to face the upper-half portion of the front wheel 9 in the longitudinal direction from behind. This front vertical wall portion 15b extends inward and forward from a front end portion of the hinge-attachment wall portion 15a, and is configured to slant downward and rearward in the side view and also slant leftward and rearward in the plan view. The rear vertical wall portion 15c extends inward and rearward from a rear end portion of the hinge-attachment wall portion 15a, and is configured to slant leftward and forward in the plan view. The lateral wall portion 15d extends inward and upward from an upper end portion of the hinge attachment wall portion 15a, and is configured to slant rearward and downward. The lower lateral wall portion 15e extends inward and downward from a lower end portion of the hinge-attachment wall portion 15a, and is configured to slant rearward and downward.

The front vertical flange portion 15f extends rightward roughly in parallel to the front wall portion of the hinge pillar reinforcement 13 from a right end (front end) of the front vertical wall portion 15b, and is joined to the front wall portion of the hinge pillar reinforcement 13 by welding. The rear vertical flange portion 15g extends rightward roughly in parallel to the rear wall portion of the hinge pillar reinforcement 13 from a right end (rear end) of the rear vertical wall portion 15c, and is joined to the rear wall portion of the hinge pillar reinforcement 13 by welding.

The upper lateral flange portion 15h extends upward from a right end (upper end) of the upper lateral wall portion 15d via an upper step portion 15j, and is joined to the side wall portion of the hinge pillar reinforcement 13. This upper step portion 15j is formed in a bending shape and configured to be resiliently deformable in a lateral direction. The lower lateral flange portion 15i extends downward from a right end (lower end) of the lower lateral wall portion 15e via a lower step portion 15k, and is joined to the side wall portion of the hinge pillar reinforcement 13. This lower step portion 15k is formed in a bending shape and configured to be resiliently deformable in the lateral direction. The upper lateral flange portion 15h is configured to have a longitudinal length that is shorter than that of the lower lateral flange portion 15i, thereby providing both the light weight and the attachment strength.

Figure 8A:
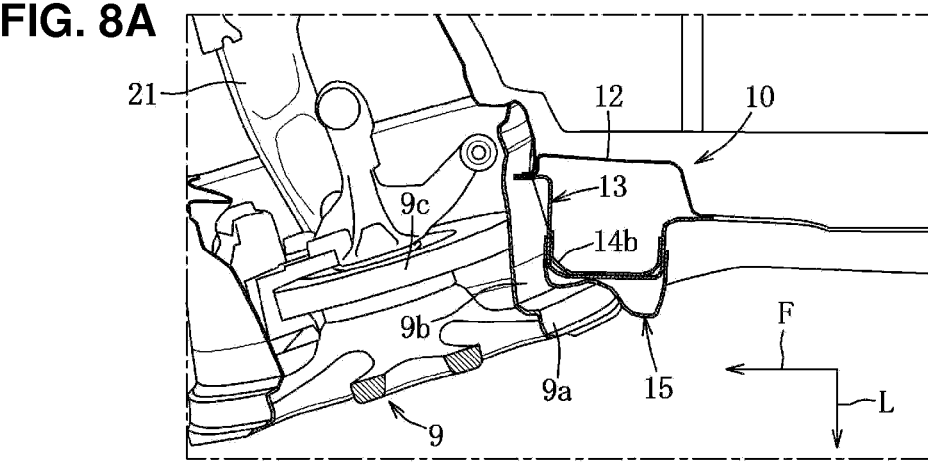
FIGS. 8A-8C are plan views showing the hinge pillar in a SOL collision, omitting illustration of a front wheel and an outer panel.

Hereafter, operations and effects of the above-described side vehicle-body structure of the vehicle V will be described. As shown in FIG. 8A, in an initial stage of the small overlap (SOL) collision with a vehicle-body left side, a collision load acts on the front wheel 9 and thereby a lower arm 21 is curved rearward. Accordingly, the front wheel 9 starts retreating, so that a peripheral wall portion of the upper-half portion of a spoke 9a collides with the front vertical wall portion 15b. Herein, since the peripheral wall portion of the spoke 9a is configured to slant leftward and rearward, this slant shape of the peripheral wall portion of the spoke 9a substantially matches the slant face of the front vertical wall portion 15b in the plan view, so that a large load-reception area can be ensured. The outer panel 11 is so thin that the influence of this strength face is small. Therefore, hereafter, collision and deformation via the outer panel 11 will be described simply as contact, collision, and deformation.

Figure 9:
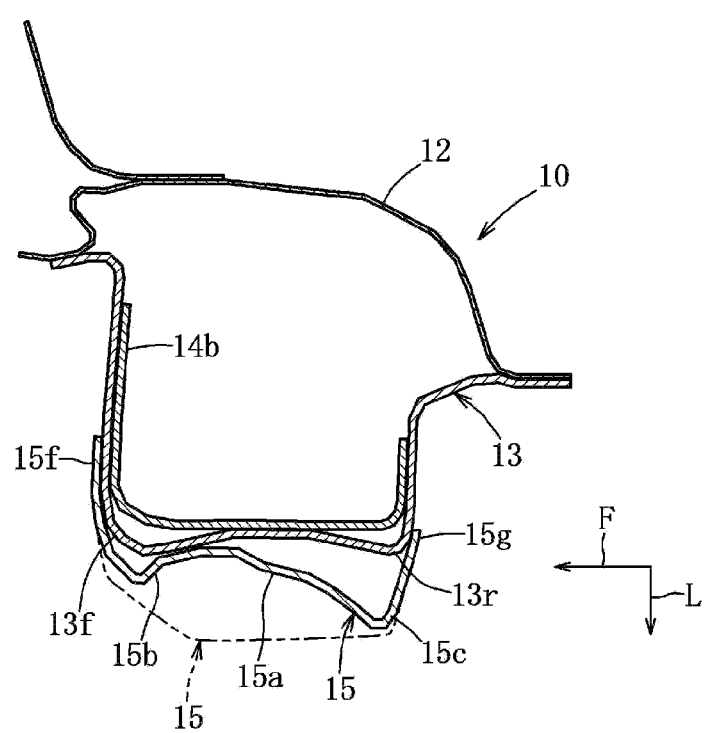
FIG. 9 is a lateral sectional view showing the hinge bracket in a crush state.

As shown in FIG. 9, the hinge bracket 15 crushes and deforms rightward, as shown by a broken line, from its original shape before deformation according to the retreat of the spoke 9a of the aluminum-made wheel. Accordingly, the contact portion of the spoke 9a with the front vertical wall portion 15b gradually moves leftward and rearward, so that the spoke 9a moves leftward when moving rearward. Consequently, the front wheel 9 starts rotating counterclockwise around the above-described contact portion. Since the upper lateral wall portion 15d and the lower lateral wall portion 15e are configured to slant rearward and downward, the deformation of the hinge bracket 15 can be promoted so as to improve the impact-absorption effect. In the collision's initial stage, since the hinge bracket 15 has the lower strength than the portion of the hinge pillar reinforcement 13 where the hinge bracket 15 is provided (i.e., in the vicinity of the hinge bracket 15), the collision load is absorbed by the hinge bracket 15 deforming mainly, so that a font ridgeline 13f and a rear ridgeline 13r of the hinge pillar reinforcement 13 change little from their original states before the collision.

Figure 8B:
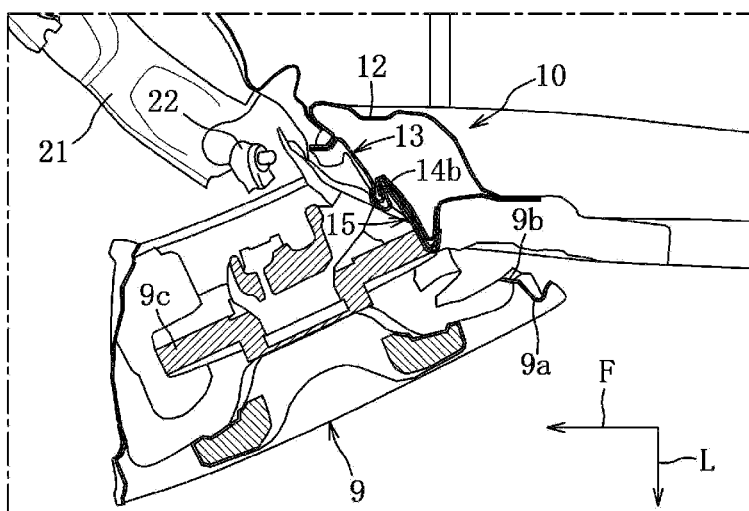

When the retreat of the front wheel 9 continues, the hinge bracket 15 completes its deformation or gets detached from the hinge pillar reinforcement 13 in the middle of its deformation, so that a rim 9b and the hinge pillar reinforcement 13 collide with each other and deform accordingly. In the collision's middle stage, as shown in FIG. 8B, the joint portion 22 starts being broken, so that a brake disc 9c collides with a left-side front end portion of the hinge pillar reinforcement 13 partially crushing, and the deformation of the hinge pillar reinforcement 13 increases accordingly. The contact portion of the brake disc 9c and the hinge pillar reinforcement 13 moves rearward gradually, and the front wheel 9 further rotates around this rearward-moving contact portion.

Figure 8C:
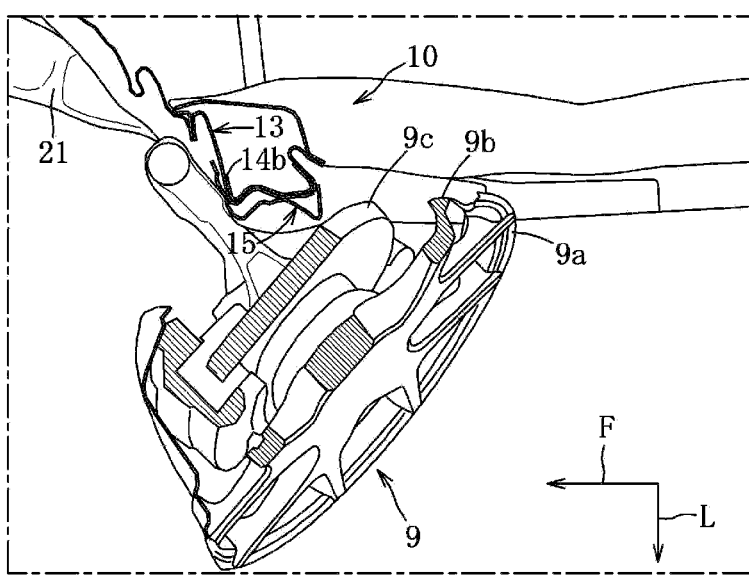

In the collision's late stage, as shown in FIG. 8C, the joint portion 22 is completely broken, so that the front wheel 9 is detached from the vehicle-body side. Consequently, the contact state of the brake disc 9c with the hinge pillar reinforcement 13 is released. Accordingly, the amount (degree) of deformation of the hinge pillar 10 which is caused by the interference with the front wheel 9 can be reduced, so that the deformation of the vehicle compartment's space which is caused by the collision load inputted from the front wheel 9 can be prevented.

According to the present side vehicle-body structure of the vehicle V, since the hinge bracket 15 has the lower strength than the portion of the hinge pillar reinforcement 13 where the hinge bracket 15 is provided (i.e., in the vicinity of the hinge bracket 15), it is not necessary that the hinge pillar reinforcement 13 including the portion where the hinge bracket 15 is provided is configured to have a strength that is high enough to bear the collision load. Therefore, light weight of the hinge pillar reinforcement 13 can be attained. Further, since the hinge bracket 15 is configured to be deformable or detachable from the hinge pillar reinforcement 13 when receiving the collision load from the front wheel 9, the front wheel 9 which retreats because of deformation of the hinge bracket 15 can be guided outward in the vehicle width direction properly when the collision load is inputted from the front wheel 9.

Since the hinge bracket 15 is formed as a separate member from the hinge pillar reinforcement 13 and attached to the hinge pillar reinforcement 13 and the hinge bracket 15 is configured to deform or be detached from the hinge pillar reinforcement 13 when receiving the collision load from the front wheel 9, in the vehicle V in which the hinge bracket 15 is formed as the separate member from the hinge pillar reinforcement 13 and attached to the hinge pillar reinforcement 13, the retreating front wheel 9 can be guided outward in the vehicle width direction properly when the collision load is inputted from the front wheel 9.

The front vertical wall portion 15b of the hinge bracket 15 is configured to face the upper-half portion of the front wheel in the longitudinal direction and slant downward and rearward in the side view. Accordingly, the front vertical wall portion 15b forms a large-area load reception portion with the slant portion of the front wheel 9, so that the efficiency of load transmission can be increased. Therefore, the outward guidance of the retreating front wheel 9 can be promoted with a simple structure.

Next, some modifications of the above-described embodiment will be described.

1) While the hinge bracket and the hinge pillar reinforcement are formed separately from each other and attached together in the above-described embodiment, these members may be formed integrally as a single-piece member. In this case, after the hinge pillar reinforcement including the hinge bracket is formed through pressing, a specified thermal treatment may be applied to a hinge-bracket portion of that so that the strength of this hinge-bracket portion becomes lower than that of the other part. Thus, since the hinge bracket has the lower strength than the portion of the hinge pillar reinforcement where the hinge bracket is provided, in the vehicle in which the hinge bracket is formed as the single-piece member, the retreating front wheel can be guided outward in the vehicle width direction properly when the collision load is inputted from the front wheel as well as the above-described embodiment.

2) While the above-described embodiment describes the example in which the hinge pillar reinforcement is made from the high tension steel and the hinge bracket is made from the soft steel, any kind of combination of the materials is applicable as long as the hinge bracket is configured to have the lower strength than the portion of the hinge pillar reinforcement where the hinge bracket is provided. Further, in a case where the hinge pillar reinforcement is configured to be split into the portion where the hinge bracket is provided including the hinge bracket and the other part, the strength of the portion where the hinge bracket is provided may be configured to be higher than that of the hinge bracket.

3) While the above-described embodiment describes the example in which the front wheel is equipped with an aluminum-made wheel having a single-piece structure, any wheel having a two-piece structure or a three-piece structure may be adopted. Further, any rim-type of wheel, such as formula type or revers type, can provide the above-described effects. Any other wheel than the aluminum-made one is applicable as well.

4) The present invention should not be limited to the above-described embodiment, and any other modifications or improvements may be applied within the scope of a spirit of the present invention.

What is claimed is:

1. A side vehicle-body structure of a vehicle, comprising:
   a hinge pillar comprising an outer panel and an inner panel which form a closed cross section extending vertically;
   a hinge pillar reinforcement provided in the closed cross section of the hinge pillar;
   a front door attached to the hinge pillar via a pair of upper-and-lower door hinges; and
   a hinge bracket attaching the lower door hinge to the hinge pillar reinforcement, the hinge bracket being provided to face a front wheel in a longitudinal direction,
   wherein said hinge bracket has a lower strength than a portion of said hinge pillar reinforcement where the hinge bracket is provided,
   said hinge bracket including a front wall portion, and the front wall portion being configured to slant downward and rearward in a side view to assist in deflection of the front wheel during a front impact collision.

2. The side vehicle-body structure of the vehicle of claim 1, wherein said hinge bracket is integrally formed at said hinge pillar reinforcement, and configured to deform when receiving a collision load from the front wheel.

3. The side vehicle-body structure of the vehicle of claim 1, wherein said hinge bracket includes a pair of upper-and-lower lateral wall portions, the pair of upper-and-lower lateral wall portions are configured to slant rearward and downward in a side view.

4. The side vehicle-body structure of the vehicle of claim 2, wherein said hinge bracket includes a pair of upper-and-lower lateral wall portions, the pair of upper-and-lower lateral wall portions are configured to slant rearward and downward in a side view.

5. The side vehicle-body structure of the vehicle of claim 1, wherein said hinge bracket is formed as a separate member from said hinge pillar reinforcement and attached to the hinge pillar reinforcement, and the hinge bracket is configured to deform or be detached from the hinge pillar reinforcement when receiving a collision load from the front wheel.

6. The side vehicle-body structure of the vehicle of claim 5, wherein said hinge bracket includes a pair of upper-and-lower lateral wall portions, the pair of upper-and-lower lateral wall portions are configured to slant rearward and downward in a side view.

7. The side vehicle-body structure of the vehicle of claim 1, wherein said front wall portion is located above a horizontally extending center line of the front wheel.

\* \* \* \* \*